United States Patent [19]
Lapeyre

[11] 3,797,071
[45] Mar. 19, 1974

[54] SHRIMP PEELING WHEEL SUPPORT ALIGNMENT LOCKING DEVICE
[75] Inventor: James M. Lapeyre, New Orleans, La.
[73] Assignee: The Laitram Corporation, New Orleans, La.
[22] Filed: Sept. 25, 1972
[21] Appl. No.: 292,113

[52] U.S. Cl. .................................................. 17/73
[51] Int. Cl. ............................................. A22c 29/00
[58] Field of Search........................... 17/73, 71, 54

[56] References Cited
UNITED STATES PATENTS
3,135,015   6/1964   Martinez................................ 17/73
2,637,065   5/1953   Lapeyre et al........................ 17/73

Primary Examiner—Louis G. Mancene
Assistant Examiner—D. L. Weinhold
Attorney, Agent, or Firm—Wilkinson, Mawhinney & Theibault

[57] ABSTRACT

The present disclosure is directed to maintaining horizontal alignment of peeling and cleaning rolls in a shrimp peeler and cleaner by restricting rotary movement of the posts without inhibiting up and down movement of adjacent posts at the base of which are journalled the peeling rolls. This is accomplished by molding flat walled projections at the base of the posts over which are received a locking member having a plurality of openings therethrough the walls of which are complemental to the flat walls of the projections in one direction and which are slightly greater in the other direction to permit relative vertical movement between adjacent posts.

5 Claims, 5 Drawing Figures

SHRIMP PEELING WHEEL SUPPORT ALIGNMENT LOCKING DEVICE

An object of the present invention is to provide an improved mounting of the peeling roll posts in the shrimp cleaner and peeler shown and described in prior U.S. Pat. No. 2,637,065 and particularly replace the mounting and structure shown in FIGS. 3 and 5 of the drawings of said patent.

A further object of the present invention is to provide peeling roller mounts which may be molded and which have surfaces at the base of the posts which have geometric flat surfaces which mate with a locking member having openings therethrough which openings snuggly complementally engage the flat surfaces at the base of the posts in one direction and which are in excess of the flat surfaces in a direction at right angles to the direction of snug fit to restrain any misalignment of the parallelism of adjacent peeling rollers while permitting adjacent peeling rollers to move vertically relative to one another.

With the foregoing and other objects in view the invention will be more fully described hereinafter and more particularly pointed out in the appended claims.

In the drawings in which like parts are denoted by reference characters throughout the several views.

Figure 1:
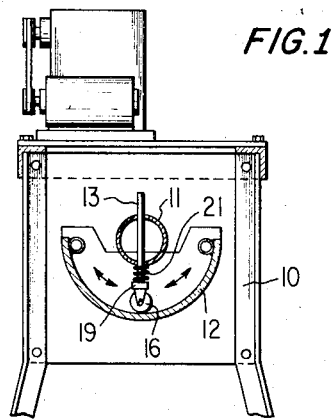
FIG. 1 is a transverse section through a shrimp cleaner and peeler showing the shrimp peeling wheel support alignment and locking device of the present invention installed thereon.
Figure 2:
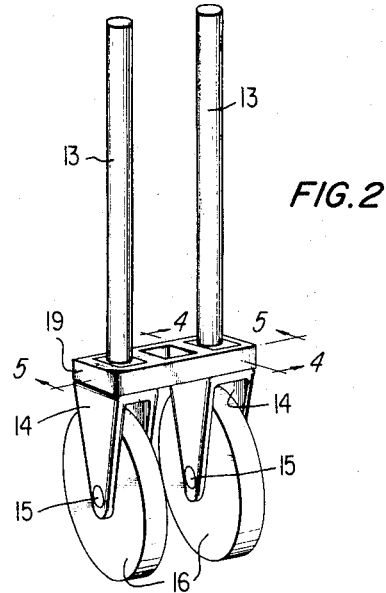
FIG. 2 is a perspective view of two peeling wheel supports and posts with the alignment and locking device of the present invention thereon.

Referring now to the drawings and for the moment to FIG. 1 10 designates generally a shrimp cleaner and peeler to which the structure of the present invention is applied. This structure has a shaft 11 which may be hollow and extends longitudinally of a trough 12 and is journalled for oscillatory movement on an axis which substantially coincides with the axis of curvature of the trough 12. The shaft 11 has a plurality of longitudinally spaced apart pairs of openings which are disposed in substantial diametrical relation so that the openings of each pair are in registry to receive slidingly therethrough the posts 13 of roller or peeling units which have a lower forked portion 14 which received therethrough pins 15 on which are journalled the rubber peeling rollers or wheels 16.

Figure 3:
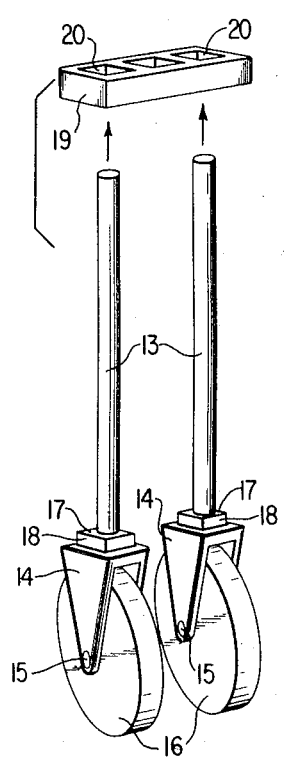
FIG. 3 is a view similar to FIG. 2 with the locking device elevated above but in alignment with the geometric projections at the base of the posts.

As best seen in FIG. 3 at the base of the posts 13 where they join the fork portions 14 are upstanding projections 17 having regular or flat wall surfaces 18. While the form of the invention shown in FIG. 3 is that of substantially a square having four flat sides 18 it will be appreciated that for the invention to be operative to restrain any relative rotary motion between the spaced apart adjacent posts 13 shown in FIG. 3 that only one surface of each opening 20 in the locking device 19 need be flat to correspond with a flat surface on the upstanding projections 17.

Figure 4:
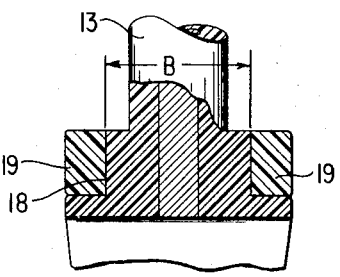
FIG. 4 is a vertical section taken on the line 4—4 in FIG. 2.
Figure 5:
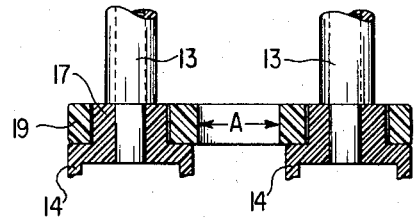
FIG. 5 is a vertical section taken on the line 5—5 in FIG. 2.

The locking device which cooperates with the flat walled upstanding projections 17 at the base of the posts is a generally rectangular member 19 having openings 20 therethrough. The openings 20 as shown in FIGS. 4 and 5 snuggly engage the flat wall surfaces of the projections 17 in one direction as shown in FIG. 4 while in a direction at right angles to that direction the opening 19 is slightly greater. This is demonstrated by the line B which shows the snug fit in the direction of oscillatory movement of the posts 13 while the line A shows a slightly greater opening for the opening 20 in a direction at right angles to the direction shown in FIG. 4. This is to lock the projections 17 with the locking member 19 to restrain any rotary motion of the post 13 which would tend to permit a cocking or misalignment of the plane of rotation of the roller 16 that is to maintain them in true parallelism during their oscillatory movement shown by the arrows in FIG. 1.

The slightly greater dimension A of the opening 20 in the locking member 19 will permit as shown in FIG. 5 the righthand post 13 to be elevated slightly relative to the lefthand post 13 incident to the rollers 16 engaging by way of example shrimp in the trough which the rollers are working upon and to permit them to move vertically while holding them captive against rotation horizontally about the vertical axis of the posts 13.

The concept of providing modular units which may be readily assembled is obtained with the posts 13 and their cooperation through the projections 17 with the locking member 19. Of primary importance is the restraint against horizontal rotation of the posts 13 which would permit misalignment or lack of maintenance of true parallelism between the roller 16 and this is obtained by having a projection 17 upstanding from the forked ends 14 which has at least one flat surface plane. While a square has been shown having four flat sides it would be appreciated that this could be obtained with a triangle or even with a partially circular projection having at least one flat side portion.

To obtain both advantages of the present invention a square or regular geometric body must be employed which will permit of the rocking movement incident to the raising or lowering vertically of one of the posts 13 to partake of the additional distance shown as A in FIG. 5 over the distance B shown in FIG. 4.

When the units are assembled by placing them through the shaft 11 the roller 16 are urged into contact with the trough 12 under the resilient loading of spring members 21, one spring being provided for each post 13.

What I claim is:

1. For use with a shrimp cleaner and peeler having a hollow shaft extending longitudinally of a trough and journalled for oscillatory movement on an axis which coincides with the axis of curvature of the trough, peeling wheel supports comprising
   a. a pair of posts adapted to be resiliently loaded to pass through said hollow shaft,
   b. fork means at the base of said posts receiving therethrough pins on which are journalled peeling rolls,
   c. geometric projections upstanding from said fork means, and
   d. locking means extending over at least two adjacent posts and having portions complementally engaging said geometric projections to maintain the peeling rolls carried by each fork means of each post in parallelism and permitting up and down relative movement between adjacent posts incident to the peeling rolls contacting shrimp in the trough upon their oscillatory movement therein.

2. A peeling wheel support structure as claimed in claim 1 wherein said geometric projections have at least one flat side to restrain rotary movement of the posts about their vertical axis.

3. A peeling wheel support structure as claimed in claim 2 wherein said locking means is a rectangular member having at least two openings therethrough from top to bottom the walls of which complementally snuggly fit the geometric projections in one direction and are greater in the direction normal to said first direction.

4. A peeling wheel support structure as claimed in claim 1 wherein said geometric projections have flat regular walls.

5. A peeling wheel support structure as claimed in claim 4 wherein the portions of said locking means which engage the projections have flat regular walls.

* * * * *